United States Patent
Guyton

[11] 3,841,760
[45] Oct. 15, 1974

[54] ZONAL FOCUS METHOD FOR DETERMINING THE AMOUNT OF ASTIGMATIC CORRECTION FOR AN OPTICAL SYSTEM

[76] Inventor: David L. Guyton, 5505 Huntington Pky., Bethesda, Md. 20014

[22] Filed: Feb. 27, 1973

[21] Appl. No.: 336,324

[52] U.S. Cl. .................................. 356/124, 351/39
[51] Int. Cl. ............................................ G01b 9/00
[58] Field of Search ........... 356/124, 125, 126, 127; 351/6, 13, 39

[56] References Cited
UNITED STATES PATENTS

| | | | |
|---|---|---|---|
| 1,542,112 | 6/1925 | Tillzer | 356/127 |
| 1,608,725 | 11/1926 | Currier et al. | 356/125 |

Primary Examiner—Ronald L. Wibert
Assistant Examiner—Conrad Clark
Attorney, Agent, or Firm—H. R. Berkenstuck, Jr.; W. C. Nealon

[57] ABSTRACT

A zonal focus test used in the prior art to locate a principal meridian of an astigmatic optical system is adapted for use in determining the amount of astigmatic correction necessary for such an optical system. After the principal meridians of the astigmatic subject optical system are located, after the principal meridians of variable optical correcting means are aligned with the principal meridians of the subject optical system, and after the optical correcting means are varied to correct one specified meridian of the subject optical system according to prior art techniques, the zonal focus test of the present invention is applied to the combination of the subject optical system and the optical correcting means in a non-principal meridian, preferably one of the meridians 45° to the principal meridians of the optical correcting means, whereupon an error is indicated by the test. The dioptric power of the optical correcting means is then varied, holding the power in the previously corrected meridian constant, until the zonal focus test no longer indicates an error. At this point the principal meridians of the total optical combination have disappeared, the corrected subject optical system is anastigmatic, and the amount of astigmatic correction for the subject optical system that is necessary for this condition is represented by the astigmatic power of the optical correcting means.

7 Claims, 12 Drawing Figures

PATENTED OCT 15 1974 3,841,760

PATENTED OCT 15 1974

ZONAL FOCUS METHOD FOR DETERMINING THE AMOUNT OF ASTIGMATIC CORRECTION FOR AN OPTICAL SYSTEM

REFERENCE TO COPENDING APPLICATION

This application makes reference to my copending application Ser. No. 336,323, entitled "Method and Apparatus for Locating a Principal Meridian of An Astigmatic Optical System" filed on instant date herewith, now U.S. Pat. No. 3,785,723, which is incorporated herein by reference.

BACKGROUND OF THE INVENTION

1. Field of the Invention

The invention relates generally to methods for determining the focal properties of a subject optical system including the focal properties of a patient's eye, and relates more particularly to zonal focus methods for determining the amount of astigmatic error in a subject optical system.

2. Prior Art

Zonal focus methods are widely used for determining the focal properties of optical systems. In the fields of photographic and telescopic optics these methods are generally known as variations of the Hartmann test or of the zonal Foucault test. In ophthalmic optics such methods are known as adaptations of the Scheiner principle. In all zonal focus methods the focal properties of various subdivisions, or zones, of the available aperture of the optical system under test are investigated, usually with the assumption that the focal properties of the full aperture of the optical system may thus be deduced. The advantage in testing with zonal focus methods is the increased precision with which endpoints of adjustment may be judged, or the increased precision with which measurements of test images may be made.

Often the focal properties of an optical system are measured in terms of the optical correction necessary to neturalize "error" that exists in the system, as is the case in determining the refractive error of a patient's eye, or in determining the power of a spectacle lens. The error is determined with respect to a specified pair of conjugate points. One point on the retina of a patient's eye and a second point on the far wall of an examining room are often used when determining the error of a patient's eye. The endpoint of adjustment when neutralizing an optical error usually involves judging the best focus of a test image. A focus endpoint is often difficult to judge. By using zonal focus methods in neutralizing optical errors, focus endpoints are usually replaced by superposition or alignment endpoints which may be judged with great precision. An example of a zonal focus method using an alignment endpoint will be described later in this disclosure.

When using zonal focus methods to determine the astigmatic correction for a subject optical system, such correction being with respect to a specified pair of conjugate points, three optical determinations are commonly made. First the two principal meridians of the subject optical system are located. Secondly the dioptric power correction for one principal meridian is determined, and thirdly the dioptric power correction for the second principal meridian is determined. The amount of astigmatic correction is equal to the difference between the dioptric power corrections for the two principal meridians. The astigmatic correction is thus the algebraic difference between two measured values and therefore is subject to greater experimental error than either of the two measured values alone. This is an obvious disadvantage of the measurement method, as the required parameter is not measured directly.

A further disadvantage of this measurement method is evident when determining the refractive correction for a patient's eye. The dioptric power correction determined for each principal meridian is a measure of the spherical correction for that meridian. The total spherical power of the normal eye is continuously changing, however, because of fluctuation in accommodation. Therefore the dioptric power corrections for the two principal meridians must be measured at exactly the same point in time for their difference to be meaningful. Such simultaneous measurement has never been satisfactorily accomplished with prior art zonal focus techniques. Tests have been devised using a test image which indicates in different parts of the same field of view the power error in the two principal meridians, but a patient viewing such an image, or an examiner viewing such an image formed on the retina of the patient's eye, must still judge two separate endpoints and is therefore measuring the two principal meridians at different points in time.

SUMMARY OF THE INVENTION

Accordingly, it is an object of the present invention to provide a zonal focus test having a single endpoint of adjustment for determining directly the amount of astigmatic correction for a subject optical system. It is a further object to provide a zonal focus test which is not influenced by small fluctuations in accommodation when determining the astigmatic correction for a patient's eye.

These objects are accomplished by the use of a type of zonal focus test used in the prior art only for locating a principal meridian of an astigmatic subject optical system. The test image formed by this type of zonal focus test has its parts displaced laterally, or misaligned with one another, whenever the target image being viewed is not parallel to one of the principal meridians of the subject optical system. For locating a principal meridian, the target image and the zone arrangement through which the target image is viewed are rotated together from one meridian to the next until alignment of the parts of the test image is achieved. A more detailed description of this type of zonal focus test is given later in the disclosure.

According to the present invention the type of target image and zone arrangement formerly used only for locating a principal meridian are used now for indicating the presence of residual principal meridians during the process of astigmatic correction. Prior to applying the test according to the present invention, methods known to the art are used to locate the principal meridians of the subject optical system, to align the principal meridians of optical correcting means of variable spherical and cylindrical power with the principal meridians of the subject optical system, and to optically correct a single specified meridian of the subject optical system. Now the zonal focus test of the present invention is applied to the combination of the subject optical system and the optical correcting means, the test being applied in a non-principal meridian, preferably in one of the meridians 45° to the principal meridians of the optical correcting means, whereupon the test image obtained appears misaligned, the misalignment indicating the fact that principal meridians exist, therefore uncorrected astigmatism exists. At this point the dioptric power correction for the previously corrected meridian is held constant while the dioptric power of the optical correcting means is otherwise varied, during which procedure the test image of the zonal focus test is observed. As the correct amount of astigmatic correction is obtained, the parts of the test image become aligned with one another indicating the fact that principal meridians for the total optical combination no longer exist, and therefore uncorrected astigmatism no longer exists. The amount of astigmatic correction for the subject optical system that is necessary for this condition is represented by the astigmatic power of the optical correcting means.

The total astigmatic correction for the subject optical system is thus obtained with a final test having a single endpoint of adjustment. As will be explained in detail later in the disclosure, zonal focus tests which indicate principal meridional alignment error are effective even in the presence of certain amounts of dioptric power error, and therefore a small error in the preliminary correction of one specified meridian of the subject optical system has little effect of the accuracy of the astigmatic correction obtained by the single endpoint test. Also because of this leeway tolerated in necessary dioptric power correction, small fluctuations in accommodation of a patient's eye do not influence the accuracy of the test.

One embodiment of the invention utilizes a zonal focus test wherein only a small number of zones of the subject optical system participate in the formation of the test image, such a test being a variation of the Scheiner principle.

Another embodiment of the invention utilizes a zonal focus test wherein substantially all zones of the subject optical system participate in the formation of the test image, such a test being the subject of my beforementioned copending application.

BRIEF DESCRIPTION OF THE DRAWINGS

Other objects, features, and advantages of the invention will be apparent from the following more detailed description of the invention wherein.

DESCRIPTION OF PREFERRED EMBODIMENTS

Figure 1A:
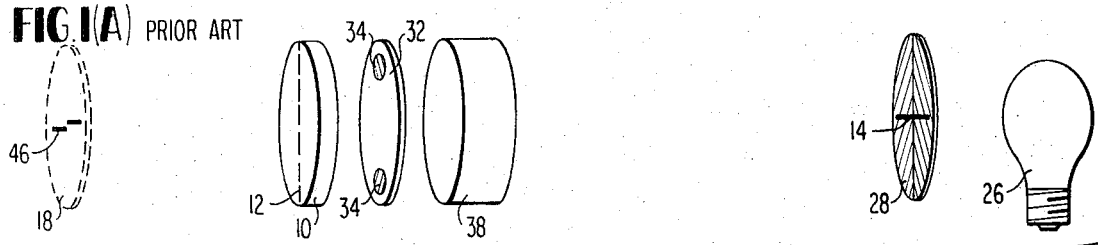
FIG. 1(A) is a diagrammatic perspective view of a prior art arrangement of optical elements used according to the Scheiner principle for demonstrating the presence of dioptric power error in the vertical meridian of a subject optical system.

FIGS. 1 through 5 show many parts in common. To avid repetition, these parts will be described first along with their general relationship to one another. Each figure shows a zonal focus test applied to a subject optical system, to the optical system 10 in FIGS. 1, and to the astigmatic optical system 20 in FIGS. 2 through 5. The orientation of the vertical meridian of optical system 10 is indicated by the dashed line 12. The orientation of the principal meridians of astigmatic optical system 20 are indicated by dashed lines 22 and 24.

The object of each zonal focus test is to provide an observable endpoint for determining the correction for a particular focal property of the subject optical system. The correction to be determined is with respect to two specified points which wil become conjugate when the subject optical system is completely corrected. A target or target image is positioned at one of these specified points. The target is represented by the opaque line target 14 in FIGS. 1 through 3, and by the slit aperture target 16 in FIGS. 4 and 5.

The test image produced by each zonal focus test is examined at the second of the two specified points. To indicate the position of this second point, a dashed line outline of an imaging screen 18 is shown in FIGS. 1 through 5. The imaging screen 18 might represent the retina of a patient's eye, an actual ground glass imaging screen, a photoelectric image detection device, or simply an image plane which is further imaged by an additional viewing system.

Each target is illuminated by a light source 26. The opaque line target 14 is affixed to a transparent split-field disk 28 and is oriented perpendicular to the line of division of disk 28. The two halves of the split-field disk 28 are composed of polarizing material with the two polarizing axes oriented at right angles to one another. The slit aperture target 16 is cut or photographically produced in disk 30 which is otherwise opaque.

Zone defining means are an essential part of each zonal focus test. For each zonal focus test used in FIGS. 1 through 3, a Scheiner disk 32 serves as the zone defining means. The Scheiner disk 32 is a thin opaque stop having two small apertures 34 formed within it. Each aperture 34 has inserted in it a small piece of polarizing material such that the polarizing axes of the two apertures 34 are at right angles to one another and correspond in orientation to the axes of the two halves of the splitfield disk 28. For each zonal focus test used in FIGS. 4 and 5, an array of slit apertures 36 serves as the zone defining means.

Variable optical correcting means appear in FIGS. 1 through 5 as spherical optical correcting means 38 in FIGS. 1 and 2, and as astigmatic optical correcting means 40 in FIGS. 3 through 5. It should be noted that the optical correcting means may be one of a variety of such means known to the art. A simple form of optical correcting means comprises individual lenses or combinations of individual lenses as commonly positioned before a patient's eye during the clinical procedure of refraction. A second simple form of optical correcting means comprises a fixed lens system used in combination with means for causing displacement of the target along the axis of the fixed lens system, thereby varying the vergence of the light from the target which emerges on the opposite side of the fixed lens system. A more complicated form of optical correcting means uses cylindrical lenses rotating with respect to one another or moving axially with respect to one another to provide a continuum of variable spherical and cylindrical power. Because of this variety of optical correcting means, the optical correcting means in FIGS. 1 through 5 is illustrated in symbolic form. It should be understood that the methods of the prior art and the method of the present invention may be used equally as well with a great variety of optical correcting means.

Before stating the details of the preferred embodiments of the present invention, the prior art will be closely examined in order to make clearer the relationship to the present invention of methods and apparatus well known in the art.

FIG. 1(A) shows a zonal focus test utilizing the Scheiner principle to demonstrate the presence of dioptric power error in an arbitrary meridian, here the vertical meridian 12 of subject optical system 10. Line target 14 is oriented at right angles to meridian 12, and the zone defining apertures 34 are spaced apart from one another in a direction parallel to meridian 12. One of the apertures 34 "sees" one half of line target 14, and the second of the apertures 34 "sees" second half of line target 14 because of the effect of the polarizing means previously described. Spherical optical correcting means 38 is illustrated but has zero dioptric power. Test image 46 is formed on imaging screen 18 and represents an image of line target 14 with its two halves displaced laterally from one another, such a displacement indicating a dioptric power error in meridian 12 of subject optical system 10. "Lateral" displacement in this disclosure refers to displacement in the direction perpendicular to the main linear dimension of the test image. It should be noted that if the Scheiner disk 32 were removed, a blurred image of line target 14 would be observed on imaging screen 18. By using the Scheiner disk 32 with apertures 34, only two small bundles of the image-forming rays are selected. These two small bundles made up different portions of the previously blurred image, and therefore the test image which they now form consists of two parts displaced from one another. It should be noted that the depth of focus of each small bundle of rays is very great because the bundles are limited by the small apertures 34. Therefore the halves of test image 46 will each appear approximately in focus even with large dioptric power errors in meridian 12. The greater the dioptric power error in meridian 12, the greater will be the displacement of the two halves of test image 46. It should be noted also that a full double image of line target 14 would be formed on imaging screen 18 if the polarizing means were removed from the test. Use of the polarizing means as described eliminates opposite halves of the original double line image, creating the test image 46 whose misalignment is more easily judged.

Figure 1B:
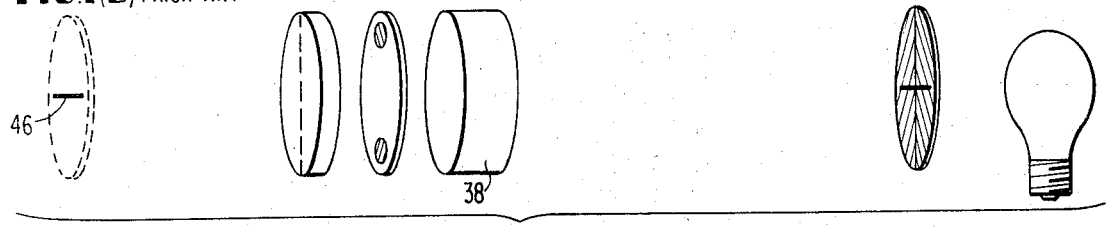
FIG. 1(B) illustrates the arrangement of FIG. 1(A) wherein the dioptric power of optical correcting means has been varied to correct the dioptric power error in the vertical meridian of the subject optical system.

FIG. 1(B) shows the arrangement of FIG. 1(A) wherein the dioptric power of optical correcting means 38 has been varied to correct the dioptric power error in meridian 12 of optical system 10. The endpoint for this correction is the alignment of the two halves of test image 46. It should be noted that for correcting the dioptric power error in a given meridian of a subject optical system as has just been illustrated, the zone defining means are oriented parallel to the meridian being corrected, whereas the line target, or a specified linear aspect of a more general target, is oriented at right angles to the meridian being corrected. The zone defining apertures may be of various shapes and may be greater than two in number. A zone defining aperture may be small as illustrated, or may be much larger. For example the two halves of the entire aperture of the subject optical system may be used as zones. With large zones, however, depth of focus through each zone is less, and the parts of the test image will be blurred as well as misaligned when a dioptric power error exists. Zone defining apertures are usually placed near the subject optical system when using the Scheiner principle type of zonal focus test. Occasionally such apertures are placed between the light source and the target and are reimaged into a position near the subject optical system, serving an equivalent function. Whether the zone defining apertures are placed or imaged coincident with, in front of, or behind the subject optical system makes little difference in the principle of the test. Also the apertures need not necessarily be placed symmetrically about the optical axis of the subject optical system. The essential point to remember when correcting dioptric power error is that dioptric power error causes displacement of test image parts in the same direction as the orientation of the zone defining apertures. Since a target should have its linear aspects oriented at right angles to the direction of displacement of its parts, the target should be oriented at right angles to the orientation of the zone defining apertures.

Figure 2A:
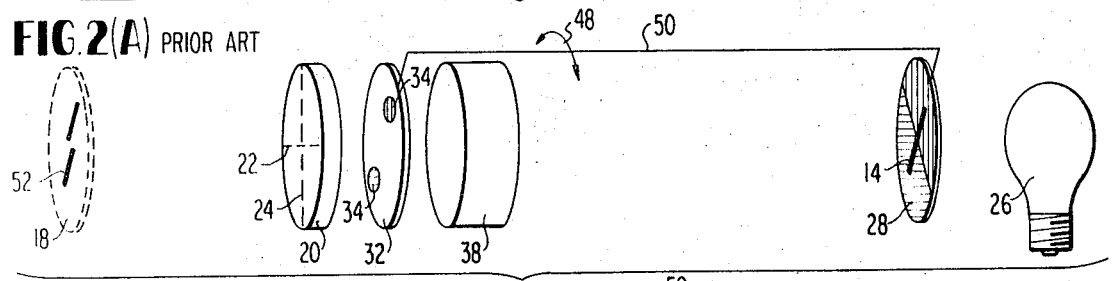
FIG. 2(A) is a diagrammatic perspective view of a prior art arrangement of optical elements used as a variation of the Scheiner principle for demonstrating the presence of an error in the alignment of a line target with a principal meridian of an astigmatic subject optical system.

FIG. 2(A) shows a zonal focus test utilizing a variation of the Scheiner principle to demonstrate the presence of an error in the alignment of line target 14 with one of the principal meridians 22 or 24 of subject optical system 20. Line target 14 is now oriented parallel to the orientation of the zone defining apertures 34. Disks 28 and 32 are rotatable together in the directions of double arrow 48 by means of movement of conventional connecting means 50 illustrated schematically. Spherical optical correcting means 38 has been varied until test image 52 is in reasonably good focus. The necessity of focus correction with optical correcting means 38 is dependent upon the size of apertures 34. With small apertures 34 the optical correcting means 38 may be omitted entirely because the depth of focus of each zonal bundle of rays is very great. Test image 52 is formed on imaging screen 18, and represents a portion of the image of line target 14, the two halves of this portion displaced laterally from one another, such displacement indicating that the meridian of the zone defining apertures 34 is not a principal meridian of subject optical system 20. Note that the displacement of the parts of test image 52 is in the direction perpendicular to the orientation of the zone defining apertures 34, not parallel as was the case when investigating dioptric power error in FIG. 1(A). Dioptric power error, if it were present in FIG. 2(A), would simply cause an additional displacement of the parts of test image 52 in the direction parallel to the orientation of the zone defining apertures 34. Such power error displacement has no effect on the lateral displacement of the two halves of test image 52, and the lateral displacement still represents principal meridional alignment error.

Figure 2B:
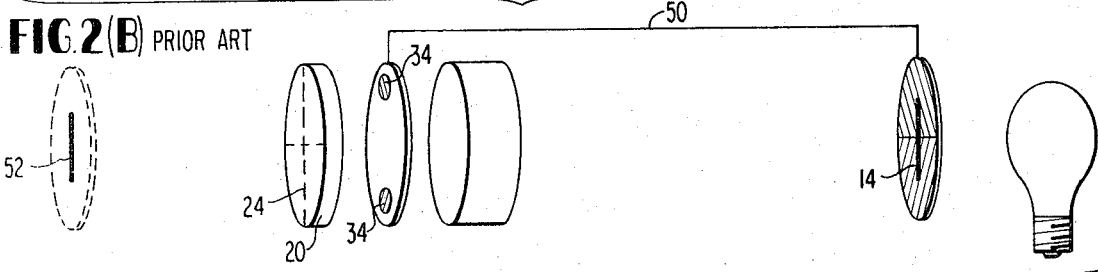
FIG. 2(B) illustrates the arrangement of FIG. 2(A) wherein the alignment of the line target with a principal meridian of the subject optical system has been accomplished.

FIG. 2(B) shows the arrangement of FIG. 2(A) wherein line target 14 and zone defining apertures 34 have been rotated together by movement of connecting means 50 until the apertures 34 are aligned with principal meridian 24 of subject optical system 20. The endpoint for this adjustment is the lateral alignment of the two halves of test image 52. If dioptric power error exists in principal meridian 24, the two halves of test image 52 will be overlapped lengthwise, or separated apart lengthwise, but their lateral alignment with each other will be correct. By this means principal meridional alignment error is distinguished from dioptric power error.

Having located a principal meridian as in FIG. 2(B), the location of both principal meridans is known, for the second is always perpendicular to the first in regularly astigmatic optical systems. It is now common practice to correct the dioptric power error in each principal meridian separately using a target and zone defining arrangement such as illustrated in FIG. 1(A). The amount of astigmatic correction necessary for the subject optical system is then derived by taking the difference between the dioptric power corrections for the two principal meridians. For reasons pointed out earlier in this disclosure, this method of obtaining the amount of astigmatic correction is subject to error, particularly if the spherical power of the subject optical system is continuously fluctuating as is the case with the optical system of a patient's eye.

Having thus examined closely the general principles of the prior art, the preferred embodiments of the present invention will be described in detail.

Figure 3A:
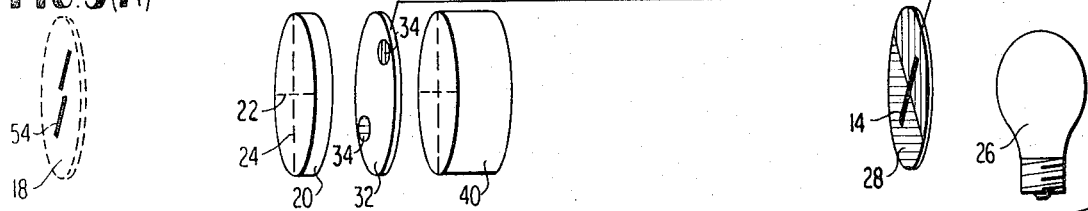
FIG. 3(A) is a diagrammatic perspective view of an arrangement of optical elements according to one embodiment of the present invention wherein the presence of uncorrected astigmatism is indicated by a misaligned test image.

FIGS. 3 will be used to illustrate one embodiment of the present invention. Referring to FIG. 3(A), a zonal focus test is shown similar to that shown in FIG. 2(A), a zonal focus test arranged to show principal meridional alignment error. In FIG. 3(A), however, astigmatic optical correcting means 40 is provided having variable dioptric power both spherical and cylindrical and therefore having principal meridians of its own. In FIG. 3(A), several steps have already been completed, according to prior art techniques, in the correction of subject optical system 20. First the principal meridians 22 and 24 of subject optical system 20 were located, and the optical correcting means 40 was rotated such that its principal meridians were aligned with those of subject optical system 20. Secondly the dioptric power of subject optical system 20 was corrected in a specified meridian, principal meridian 24 for example, by the appropriate adjustment of optical correcting means 40. Now, as illustrated in FIG. 3(A), having accomplished the preliminary steps, line target 14 and zone defining apertures 34 are oriented parallel to each other and are positioned in a non-principal meridian, preferably in one of the meridians 45° to the principal meridians of optical correcting means 40. Generally, the selected meridian may be 10° - 80° and preferably 30° - 60° and most preferably 45° from one of the principal meridians although any meridian may be selected which results in the test image indicating that the selected meridian is not a principal meridian. The mutually parallel orientation of line target 14 and zone defining apertures 34 is used to indicate principal meridional alignment error as explained previously. Since the target 14 and zone defining apertures 34 are oriented in a non-principal meridian, the test image 54 formed on imaging screen 18 has its two halves displaced laterally from one another, this displacement indicating principal meridional alignment error. In indicating principal meridional alignment error, the misaligned test image 54 also indicates a more general fact; it indicates the presence of astigmatic error in the combination of subject optical system 20 and optical correcting means 40. If this astigmatic error were to be corrected by varying the appropriate dioptric power of optical correcting means 40, the combined optical system would be anastigmatic and would no longer have principal meridians, whereupon the halves of the test image 54 would become aligned with one another. This is precisely the nature of the zonal focus test disclosed by the present invention for determining the amount of astigmatic correction necessary for subject optical system 20.

Figure 3B:
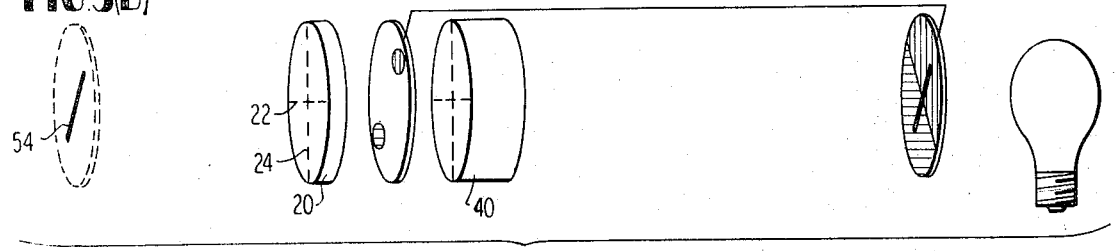
FIG. 3(B) illustrates the arrangement of FIG. 3(A) wherein the dioptric power of the optical correcting means has been varied to correct the astigmatic error of the subject optical system.

FIG. 3(B) shows the arrangement of FIG. 3(A) wherein the dioptric power of optical correcting means 40 has been varied in principal meridian 22, while holding the dioptric power constant in principal meridian 24, until the halves of test image 54 became aligned with one another. The astigmatic portion of optical correcting means 40 now represents the astigmatic correction necessary for subject optical system 20.

It is thus evident that the present invention provides a final zonal focus test, having a single endpoint of adjustment, which determines directly the amount of astigmatic correction for a subject optical system. So that the merits of this final zonal focus test will be appreciated, it is necessary now to examine the effect on the accuracy of this final zonal focus test of small errors in the steps preceding its application and of small fluctuations in spherical power of the subject optical system during its application.

There are two types of error that can be made in the preliminary steps, error in location of the principal meridians of the subject optical system and error in the dioptric power correction of the one specified meridian. Fluctuating spherical power of the subject optical system as occurs in a patient's eye is not associated with any appreciable change in the amount or orientation of astigmatic error, and therefore such fluctuation contributes only to the second type of error, the error which may be made in the dioptric power correction of the one specified meridian.

First let us consider the effect of a small preliminary error in the dioptric power correction of the one specified meridian. The arrangement of target 14 and zone defining apertures 34 in FIG. 3(A) is the arrangement usually used to locate a principal meridian. This type of arrangement, as was discussed in connection with FIGS. 2, distinguishes between principal meridional alignment error and dioptric power error in that the halves of the test image become laterally separated from one another only in the presence of principal meridional alignment error. Therefore the final zonal focus test as illustrated in FIGS. 3 can distinguish the disappearance of principal meridional alignment error even in the presence of small dioptric power error, and the astigmatic portion of optical correcting means 40 will be the correct astigmatic correction for subject optical system 20 in spite of a constant or fluctuating small spherical error remaining in the total optical combination.

Secondly let us consider the effect of a preliminary error in the location of the principal meridians of the subject optical system 20 in FIG. 3(A). If this error occurs, the principal meridians of optical correcting means 40 will not be aligned properly with meridians 22 and 24. If such misalignment is present, no combination of the spherical and astigmatic components of the dioptric power of optical correcting means 40 can completely correct the astigmatic error in subject optical system 20. There will always be a residual astigmatic error in the total optical combination. This residual astigmatic error may be minimized, however, by the appropriate selection of the astigmatic component of optical correcting means 40. This selection is accomplished automatically if the final zonal focus test of the present invention is applied to one of the meridians 45° to the principal meridians of the optical correcting means 40. Why this is so will now be explained.

The best value for the astigmatic portion of optical correcting means 40 can be determined mathematically, using as a model the ideal case of two apposed cylindrical lenses, one fixed in power and the other variable, with axes misaligned by an angle $\theta$. Using the equations describing the combination of cylindrical lenses at oblique axes (see J.P.C. Southall, *Mirrors, Prisms, and Lenses*, 3rd edition, Dover Publications, Inc., 1964, under "Obliquely Crossed Cylinders"), it can be shown that the least residual astigmatism for the combination of the two lenses results when the variable cylinder has a power equal to $-\cos 2\theta$ times the power of the cylinder with fixed power, in which case the principal meridians of the residual astigmatism will be located 45° away from the principal meridians of the cylinder with variable power. For other powers of the variable cylinder, the principal meridians of the residual astigmatism are not at this 45° orientation.

Applying this information to the actual case as illustrated in FIGS. 3, the non-principal meridian which is tested by the final zonal focus test should be one of the meridian oriented 45° to the principal meridians of the variable optical correcting means 40. Since the test image 54 of the final zonal focus test will indicate no principal meridional error either when no astigmatic error exists or when a principal meridian is parallel to test image 54, a principal meridian of any residual astigmatism will be brought to lie parallel to the orientation of test image 54 and thus 45° to the principal meridians of the optical correcting means 40, and the minimal residual astigmatism of the total optical combination will have been obtained. In other words, if an initial error is made in locating the principal meridians of subject optical system 20, the final zonal focus test as described will not measure the true astigmatic correction for the subject optical system but will actually determine the amount of astigmatic correction which best compensates for the initial error made in locating the principal meridians.

Even if no initial error is made in locating the principal meridians of subject optical system 20, there is an excellent reason for preferably applying the final zonal focus test in one of the meridians 45° to the principal meridians of optical correcting means 40. The sensitivity of the test is maximal at this orientation because the meridian being investigated is maximally misaligned with the two principal meridians of the total optical combination, causing the greatest lateral displacement possible of the halves of test image 54 for any given amount of remaining uncorrected astigmatism.

Figure 4A:
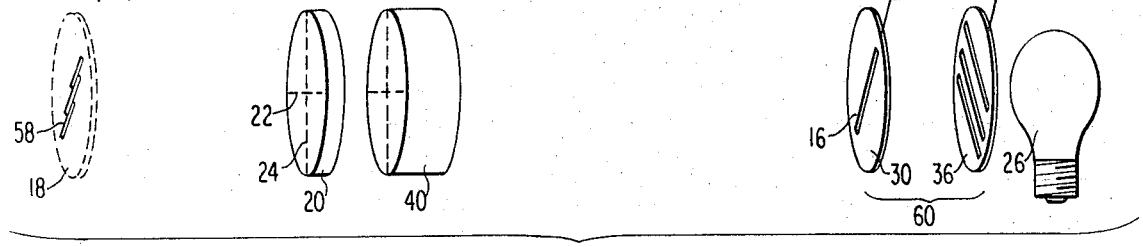
FIG. 4(A) is a diagrammatic perspective view of an arrangement of optical elements according to a second embodiment of the present invention wherein the presence of uncorrected astigmatism is indicated by a misaligned test image.

Referring now to FIGS. 4, a second embodiment of the present invention is diagrammatically illustrated. The zonal focus test illustrated in FIG. 4(A) is the same as that shown in FIG. 3(A) except that line target 14 has been replaced by slit aperture target 16, and zone defining apertures 34 have been replaced by an array of slit apertures 36 placed near the target 16 instead of near the subject optical system 20. The slit aperture target 16 and array of slit apertures 36 are oriented in meridians 90° from one another and are maintained in this relationship by conventional connecting link 56 illustrated schematically. The array of slit apertures 36 is illuminated from behind by light source 26, and slit aperture target 16 is illuminated from behind by that light which emerges from the array of slit apertures 36. By tracing the bundles of light rays from the array of slit apertures 36 through the slit aperture target 16 to the aperture of subject optical system 20, it becomes obvious that a different segment of slit aperture target 16 is effectively illuminated by each of the slit apertures 36. This relationship will be made clearer by reference to FIG. 6 which shows portions of the arrangement of FIG. 4(A).

Figure 6:
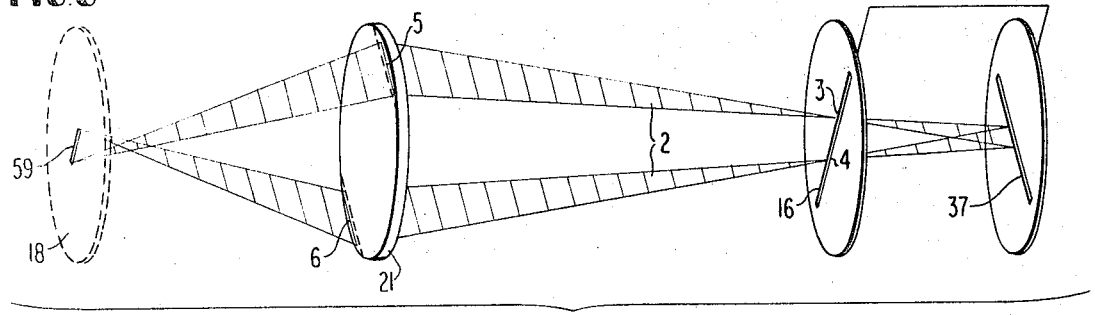
FIG. 6 is a partial representation of the arrangement of FIG. 4(A) wherein light rays have been traced to clarify the optical features of the component elements.

In FIG. 6 subject optical system 21 may be considered corrected such that a test image 59 is formed on imaging sceen 18, the test image 59 representing an image of a portion of slit aperture target 16. Slit aperture target 16 is illustrated as in FIG. 4(A). Slit aperture 37 is oriented at right angles to slit aperture target 16 and represents one of he apertures from the array of apertures 36 in FIG. 4(A). Two ribbons of light rays 2 are traced emerging from slit aperture 37, passing through points 3 and 4 of slit aperture target 16, being refracted by zones 5 and 6 of subject optical system 21, and forming the end points of test image 59 on imaging screen 18. The portion of slit aperture target 16 from point 3 to point 4 is that portion which is "seen" by the subject optical system 21 by means of the illumination from slit aperture 37. Note that point 3 is seen by only zone 5 of subject optical system 21, and point 4 is seen by only zone 6. Points along slit aperture target 16 between points 3 and 4 are seen by successive intermediate zones of subject optical system 21. The zones of subject optical system 21 may be thought of as narrow strips extending the full width of the aperture of optical system 21 and placed side by side filling the entire aperture. Each strip-shaped zone is oriented at right angles to slit aperture target 16 in FIG. 6, but the direction in which the midpoints of the various zones are disposed in relation to one another is parallel to slit aperture target 16. This is precisely the combination of target orientation and zone arrangement orientation for indicating principal meridional alignment error. If such error were introduced in subject optical system 21, each point except the midpoint of test image 59 would be displaced laterally from its original position a different amount, for each point is seen by a different zone of optical system 21. In effect the test image 59 would appear to have rotated slightly away from its original orientation, the original orientation being parallel to slit aperture target 16.

Referring now back to FIG. 4(A), the use of the array of slit apertures 36 causes multiple segments of slit aperture target 16 to be imaged as portions of test image 58. Since slit aperture target 16 is not aligned with a principal meridian of subject optical system 20 in FIG. 4(A), test image 58, when brought into reasonable focus by varying the spherical dioptric power of optical correcting means 40, will consist of an array of linear segments of light with each segment rotated slightly causing the segments to be misaligned with one another.

It is important to realize that the slit aperture target 16 and the array of slit apertures 36 when used together as in FIG. 4(A) create a zonal focus test, one which may be used to locate a principal meridian of an optical system, or one which may simply be used to indicate the presence of principal meridional alignment error. It is also instructive, however, to think of target 16 and array 36 as a combined target means 60 which is entirely equivalent to an array of astigmatic images of points of light. Such an array of astigmatic images of points of light may be produced by a variety of optical means, and the zonal focus test illustrated in FIG. 4(A) is not limited to the use of slit apertures. Such arrays of astigmatic images of points of light, the optical means of producing or simulating them, and their use in locating a principal meridian of a subject optical system are the subjects of my beforementioned copending application. This type of target means will be referred to hereafter as an astigmatic array target.

FIG. 4(A) shows a zonal focus test using an astigmatic array target 60 for the final determination of the amount of astigmatic correction necessary for subject optical system 20. As was the case when discussing FIG. 3(A), several steps have already been completed by prior art techniques in the optical correction of subject optical system 20. The principal meridians 22 and 24 of subject optical system 20 have been located, the principal meridians of optical correcting means 40 have been aligned with principal meridians 22 and 24, and the dioptric power error in a specified meridian, principal meridian 24 for example, has been corrected by appropriate adjustment of optical correcting means 40. Astigmatic array target 60 is aligned in a non-principal meridian, preferably in one of the meridians 45° to the principal meridians of optical correcting means 40. The resulting test image 58 formed on imaging screen 18 is misaligned, indicating principal meridional alignment error.

Figure 4B:
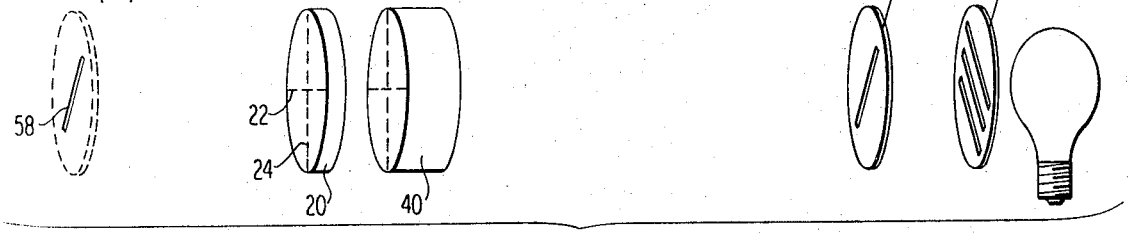
FIG. 4(B) illustrates the arrangement of FIG. 4(A) wherein the dioptric power of the optical correcting means has been varied to correct the astigmatic error of the subject optical system.

Referring now to FIG. 4(B), the arrangement of FIG. 4(A) is shown wherein the dioptric power of optical correcting means 40 has been held constant in the previously corrected principal meridian 24 while it has been varied in principal meridian 22 until the parts of test image 58 are aligned with one another, whereupon the astigmatic portion of optical correcting means 40 represents the necessary astigmatic correction for the subject optical system 20.

The zonal focus test for determining the amount of astigmatic correction according to the present invention involves the same principles whether the Scheiner principle method is used or whether an astigmatic array target is used. The astigmatic array target has two distinct advantages over the Scheiner principle method esecially when determining the astigmatic correction for a patient's eye. The patient's whole pupil is utilized with the astigmatic array target. Thus minor local irregularities in the optical system of the eye cannot cause the error that they can cause when only very small zones of the pupil are utilized. Secondly, pupillary positioning is much less critical when using the astigmatic array target. A disadvantage of the astigmatic array target is the short depth of focus of the resulting test image. Because of this short depth of focus, the preliminary optical correction for the one specified meridian must be made more accurately than when using the Scheiner principle, in order that the final test image when determining the amount of astigmatic correction be in good focus as it is brought into alignment. Some leeway in focus is still tolerated, however, for the parts of the test image may easily be aligned even though they may be slightly blurred.

Figure 5A:
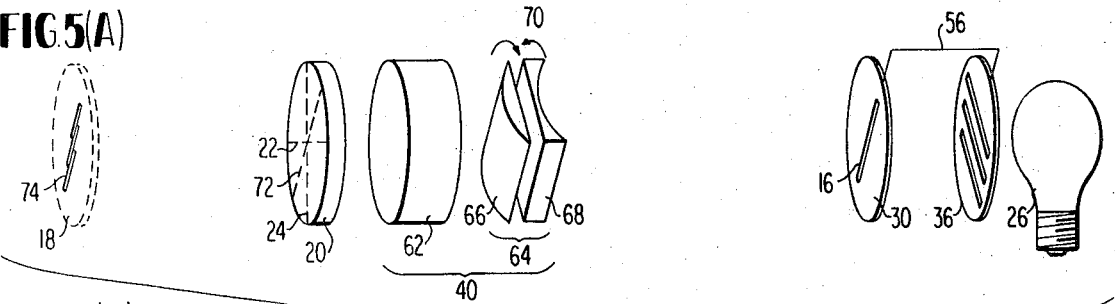
FIG. 5(A) illustrates the arrangement of FIG. 4(A) wherein the variable astigmatic portion of the optical correcting means is represented by a pair of rotatable cylindrical lenses.

FIG. 5(A) shows the arrangement of FIG. 4(A) wherein the optical correcting means 40 has been subdivided into a variable spherical portion 62 and a variable astigmatic portion 64. The astigmatic portion 64 comprises the combination of two cylindrical lenses, the combination commonly known in the art as a Stokes lens. In FIG. 5(A) the cylindrical lenses 66 and 68 are of equal but opposite dioptric power, lens 66 having positive power and lens 68 having negative power. Lenses 66 and 68 are mounted by conventional means not illustrated such that they may be rotated the same amount but in opposite directions about the optical axis of optical correcting means 40. In FIG. 5(A) the lenses 66 and 68 are illustrated with their respective axes aligned with one another, in which case the combined dioptric power of the two lenses is zero. As the two lenses are rotated by equal amounts but in opposite directions according to arrows 70, the combined dioptric power of the two lenses becomes astigmatic with principal meridians located 45° away from the original common axis orientation. The dioptric power in the two principal meridians changes by equal amounts but with opposite sign. The dioptric power in the two meridians 45° to the principal meridians remains zero.

The Stokes lens is illustrated in FIG. 5(A) for the purpose of demonstrating the zonal focus test according to the present invention wherein the specified meridian which has been pre-corrected is not one of the principal meridians of the subject optical system. In FIG. 5(A) the principal meridians 22 and 24 of the subject optical system 20 have been located, and the principal meridians of the Stokes lens have been aligned with principal meridians 22 and 24, remembering that the principal meridians of a Stokes lens are 45° away from the position where lenses 66 and 68 share a common axis. A specified meridian, in this case the meridian indicated by dashed line 72, of subject optical system 20, has been corrected by varying the spherical portion 62 of optical correcting means 40. This specified meridian 72 is not one of the principal meridians 22 or 24 of subject optical system 20, but is rather one of the meridians 45° away from meridians 22 and 24. The remainder of FIG. 5(A) is identical to FIG. 4(A).

Figure 5B:
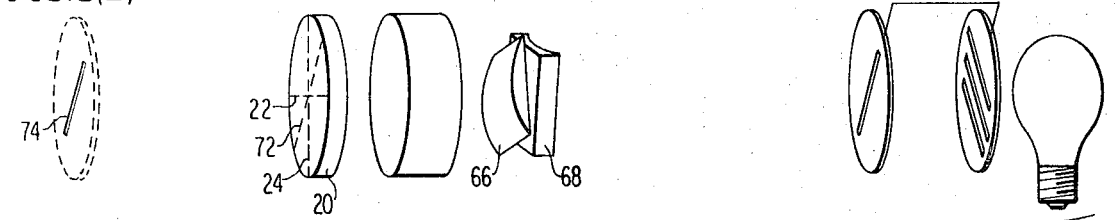
FIG. 5(B) illustrates the arrangement of FIG. 5(A) wherein the cylindrical lenses have been rotated in such a way as to correct the astigmatic error of the subject optical system.

FIG. 5(B) shows the arrangement of FIG. 5(A) wherein the lenses 66 and 68 have been rotated equal amounts but in opposite directions until the parts of test image 74 are aligned with one another, whereupon the astigmatic correction represented by the combination of lenses 66 and 68 represents the necessary astigmatic correction for subject optical system 20. Note that the dioptric power in both principal meridians 22 and 24 changed during the rotating and counter-rotating of lenses 66 and 68, whereas the dioptric power in the previously corrected meridian, meridian 72, remained constant.

Figure 7:
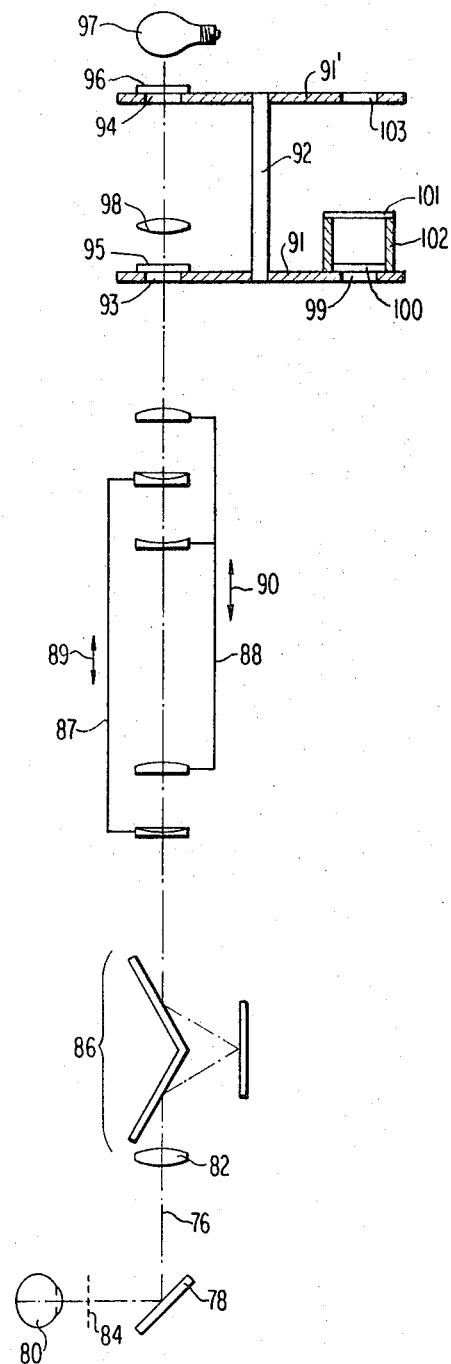
FIG. 7 is a diagrammatic plan view of apparatus which incorporates optical elements according to two embodiments of the present invention.

FIG. 7 shows a diagrammatic representation of apparatus which incorporates both the Scheiner principle type embodiment and the astigmatic array target embodiment of the present invention. The primary optical axis 76 of the apparatus is vertical, but the axis is bent into a horizontal direction by beam-splitter 78 into a patient's eye 80. Lens 82 is a spherical lens, commonly called the optometer lens in this type of apparatus, and is positioned with one of its principal focal planes coincident with dashed line 84. The position of dashed line 84 represents the usual position of a correcting spectacle lens for the eye 80. Rotating mirror assembly 86, the mirror equivalent of a Dove prism, rotates about the optical axis 76 and serves to optically rotate about optical axis 76 all optical images located or created above the mirror assembly. Lens systems 87 and 88 are cylindrical telescopic systems of equal power with axes oriented at right angles to one another, each cylindrical lens system independently movable along optical axis 76 as indicated by double arrows 89 and 90. Disks 91 and 91' are shown in cross section, are rigidly connected to rod 92 by means of which they are rotatable together, and having corresponding apertures such as apertures 93 and 94 around their peripheries such that different pairs of such apertures may be rotated into alignment with optical axis 76. A target disk 95 of the type used with the Scheiner principle method according to the present invention is placed in appropriate orientation covering aperture 93. The corresponding zone defining aperture disk 96 is placed in appropriate orientation covering aperture 94 and is illuminated from behind by light source 97. Light from the apertures in disk 96 is collimated by spherical lens 98 and remains collimated after passing through telescopic cylindrical lens systems 87 and 88 whereupon lens 82 forms an aerial image of the zone defining apertures in plane 84. The target, mounted on target disk 95, is first seen by lens systems 87 and 88 which along with lens 82 represent the optical correcting means of the apparatus. The spherical power of the optical correcting means is varied by simultaneous equal movement along optical axis 76 of lens systems 87 and 88 in the same direction. Cylindrical, or astigmatic, power of the optical correcting means is varied by movement along axis 76 of only one of the lens systems 87 and 88.

Cplindrical lens systems of this type are the subject of my U.S. Pat. No. 3,664,631. To incorporate the astigmatic array target method according to the present invention into this apparatus, a disk 100 containing the single slit aperture target is mounted in appropriate orientation covering aperture 99. A disk 101 containing the array of slit apertures, is mounted in appropriate orientation above disk 100 on the top of spacer 102, spacer 102 shown in cross section. Aperture 103 is left open such that when apertures 99 and 103 are rotated into alignment with optical axis 76, light source 97 illuminates the astigmatic array target from behind.

The apparatus as illustrated in FIG. 7 has many advantages as will be apparent to those skilled in the art. It does not form a part of the present invention but is included to illustrate a particularly useful way of incorporating the embodiments of the present invention into an apparatus with an optical correcting means having continuously variable spherical and cylindrical power.

It should be understood that the present invention deals with the method of applying a principal meridian-locating zonal focus test to a subject optical system for the purpose of determining the amount of necessary astigmatic correction for the subject optical system. The various apparatuses described, to which the method of the present invention has been applied, serve simply as a few examples of subject optical systems, optical correcting means, and zonal focus tests which may be used successfully according to the method of the present invention. A patient may examine the test image formed on his own retina, or an examiner may examine the test image by using auxiliary optical means to view the patient's retina. Photoelectric detecting means may be placed in the plane of the test image, or in a plane conjugate to this plane such that misalignment of the parts of the test image is detected by electronic means. The zones of the subject optical system utilized by a particular zonal focus test may be alternately occluded in rapid succession to cause a test image which would otherwise appear double or misaligned, to appear to move or vibrate instead. It quickly becomes evident that there is an unusually wide variety of optical systems known to those skilled in the art to which the present invention may be applied.

What is claimed is:

1. A method for determining the amount of astigmatic correction necessary to be added by optical correcting means in conjunction with spherical correction to an optical system to cause the optical system to be optically corrected to be anastigmatic for a specified pair of points comprising the steps of:

locating the principal meridians of said optical system;

aligning the principal meridians of said optical correcting means with the principal meridians of said optical system;

correcting the dioptric power of one meridian of said optical system by said correcting means;

applying a principal-meridian-locating zonal focus test to the combination of said optical system and said correcting means, by applying said zonal focus test in a non-principal meridian thereby imaging the parts of a test image in a laterally displaced manner;

examining said test image;

maintaining the dioptric power correction of said one meridian constant and simultaneously varying in other meridians the power of said correcting means so as to remove the previously effected lateral displacement of parts of said test image; and noting the astigmatic component of said correcting means whereby said astigmatic component represents the amount of astigmatic correction necessary for said optical system to be anastigmatic.

2. The method of claim 1 wherein said zonal focus test utilizes a plurality of small zones of said optical system.

3. The method of claim 1 wherein said zonal focus test utilizes substantially all zones of said optical system through the use of target means equivalent to an array of astigmatic images of points of light.

4. A method as in claim 1 where said zonal focus test is applied in one of the non-principal meridians within the range extending approximately 10° to 80° from one of the principal meridians of said correcting means.

5. A method as in claim 4 where said range extends from approximately 30° to 60°.

6. A method as in claim 5 where said zonal focus test is applied in one of the non-principal meridians 45° away from the principal meridians of said correcting means.

7. A method as in claim 1 wherein said optical system comprises the human eye and said test image is examined directly by the retina of said eye.

* * * * *